(12) United States Patent
Yin et al.

(10) Patent No.: US 8,270,496 B2
(45) Date of Patent: Sep. 18, 2012

(54) REGION OF INTEREST H.264 SCALABLE VIDEO CODING

(75) Inventors: Peng Yin, West Windsor, NJ (US); Jill MacDonald Boyce, Manalapan, NJ (US); Purvin Bibhas Pandit, Franklin Park, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1206 days.

(21) Appl. No.: 11/992,727

(22) PCT Filed: Oct. 3, 2006

(86) PCT No.: PCT/US2006/038380
§ 371 (c)(1),
(2), (4) Date: Mar. 28, 2008

(87) PCT Pub. No.: WO2007/047077
PCT Pub. Date: Apr. 26, 2007

(65) Prior Publication Data
US 2010/0158135 A1    Jun. 24, 2010

Related U.S. Application Data

(60) Provisional application No. 60/725,700, filed on Oct. 12, 2005.

(51) Int. Cl.
*H04N 7/26* (2006.01)
(52) U.S. Cl. ............ 375/240.26; 375/240.1; 375/240.12
(58) Field of Classification Search ... 375/240.1–240.26
See application file for complete search history.

(56) References Cited

U.S. PATENT DOCUMENTS 6,263,022 B1 * 7/2001 Chen et al. ............... 375/240.03
6,438,525 B1   8/2002 Park
(Continued)

FOREIGN PATENT DOCUMENTS

CN    1438641    8/2003
(Continued)

OTHER PUBLICATIONS

Hannuksela, et al., "Isolated Regions in Video Coding," IEEE Transactions on Multimedia, vol. 6., No. 2, Apr. 2004, XP-011109137.

(Continued)

*Primary Examiner* — Hassan Kizou
*Assistant Examiner* — Emmanuel Maglo
(74) *Attorney, Agent, or Firm* — Robert D. Shedd; Paul P. Kiel

(57) ABSTRACT

An encoder, a decoder, corresponding encoding and decoding methods, video signal structure, and storage media are provided for scalable video encoding and decoding. A scalable video encoder includes an encoder for encoding a picture to form a base layer bitstream and an enhancement layer bitstream. The base layer bitstream and the enhancement layer bitstream are formed by partitioning the picture into a plurality of image blocks, grouping the plurality of image blocks into one or more slice groups in the base layer bitstream and into two or more slice groups in the enhancement layer bitstream, encoding all of the one or more slice groups in the base layer bitstream and less than all of the two or more slice groups in the enhancement layer such that at least one slice group from among the two or more slice groups is intentionally un-encoded in the enhancement layer bitstream, encoding a syntax element in a header to indicate the at least one intentionally un-encoded slice group in the enhancement layer.

17 Claims, 4 Drawing Sheets

U.S. PATENT DOCUMENTS

| | | | | |
|---|---|---|---|---|
| 6,952,453 | B1 | 10/2005 | Wollborn | |
| 7,003,034 | B2* | 2/2006 | Roh | 375/240.11 |
| 7,317,759 | B1* | 1/2008 | Turaga et al. | 375/240.01 |
| 7,388,916 | B2* | 6/2008 | Park et al. | 375/240.26 |
| 2001/0011304 | A1 | 8/2001 | Wesinger | |
| 2004/0006575 | A1 | 1/2004 | Visharam et al. | |
| 2006/0062299 | A1* | 3/2006 | Park et al. | 375/240.12 |
| 2006/0233250 | A1* | 10/2006 | Cha et al. | 375/240.12 |
| 2006/0256863 | A1* | 11/2006 | Wang et al. | 375/240.08 |

FOREIGN PATENT DOCUMENTS

| | | |
|---|---|---|
| JP | 2001-268569 | 9/2001 |
| JP | 2004-248124 | 9/2004 |
| RU | 2201654 | 3/2003 |
| RU | 2284671 | 10/2004 |
| WO | WO 98/21694 | 5/1998 |
| WO | WO 99/33273 | 7/1999 |
| WO | WO 02/25925 | 3/2002 |
| WO | WO 02/32147 | 4/2002 |

OTHER PUBLICATIONS

"Applications and Requirements for Scalable Video Coding," International Organization for Standardization, ISO/IEC JTC1/SC29/WG11, Coding of Moving Pictures and Audio, NG880, Jan. 2005, China.

Index of /av-arch/jvt-site/2005_10_Nice, XP-002428646.

Li, et al., "Fine Granularity Scalability in MPEG-4 for Streaming Video," ISCAS 2000, IEEE International Symposium on Circuits and Systems, May 28-31, 2000, Switzerland, pp. I-299-I-302.

Ying, et al., "Frame Loss Error Concealment for SVC," Joint Video Team (JVT) of ISO/IEC MPEG & ITU-T VCEG (ISO/IEC JTC1/SC29/WG11 and ITU-T SG16 Q.6), 17th Meeting, France, Oct. 14-21, 2005.

Reichel, et al., "Joint Scalable Video Model JSVM-3," Joint Video Team (JVT) of ISO/IEC MPEG & ITU-T VCEG (ISO/IEC JTC1/SC29/WG11 and ITU-T SG16 Q.6), 16th Meeting, Poland, Jul. 2005.

Reichel, et al., "Scalable Video Model 3.0," International Organization for Standardization, ISO/IEC JTC 1/SC 29/WG 11, Coding of Moving Pictures and Audio, Oct. 2004, XP-002341767.

Thang, et al., "SVC CE8 report: Spatial scalability of multiple ROIs," Joint Video Team (JVT) of ISO/IEC MPEG & ITU-T VCEG (ISO/IEC JTC1/SC29/WG11 and ITU-T SG16 Q.6), 16th Meeting, Poland, Jul. 24-29, 2005, XP-002428647.

Yin, et al., "FMO and ROI Scalability," Joint Video Team (JVT) of ISO/IEC MPEG & ITU-T VCEG (ISO/IEC JTC1/SC29M/G11 and ITU-T SG16 Q.6), 17th Meeting, France, Oct. 14-21, 2005, XP-002428645.

Reichel, et al., "Joint Scalable Video Model JSVM-3 Annex S," Joint Video Team (JVT) of ISO/IEC MPEG & ITU-T.VCEG (ISO/IEC JTC1/SC29/WG11 and ITU-T SG16 Q.6), 16th Meeting, Poland, Jul. 2005.

Thang et al., "Spatial Scalability of Multiple ROIs in Surveillance Video", JVT of ISO/IEC MPEG & ITU-T VCEG, Document: JVT-O037, 15th Meeting: Busan, KR, Apr. 16-22, 2005.

Truong, E.C. et al., "Spatial Scalability of Multiple ROIs in Surveillance Video", Joint Video Team (JVT) of ISO/IEC MPEG & ITU-T VCEG, JVT-O037, 15$^{th}$ Meeting: Busan, KR, Apr. 16-22, 2005.

Richardson, J., Video Encoding H.264 and MPEG-4—Standards of a New Generation, Moscow Technosphere, 2005, pp. 113-132, 186-197.

Patent Abstract of Japan, JP 2001-268569, published Sep. 28, 2001, Matsushita Electric Ind. Co. Ltd.

Patent Abstract of Japan, JP 2004-248124, published Sep. 2, 2004, Nippon Telegraph & Telephone Corp. <NTT>.

* cited by examiner

US 8,270,496 B2

REGION OF INTEREST H.264 SCALABLE VIDEO CODING

CROSS-REFERENCE TO RELATED APPLICATIONS

This application claims the benefit, under 35 U.S.C. §365 of International Application PCT/US2006/038380 filed Oct. 3, 2006, which was published in accordance with PCT Article 21(2) on Apr. 26, 2007 in English and which claims the benefit of U.S. provisional patent application No. 60/725,700 filed Oct. 12, 2005.

FIELD OF THE INVENTION

The present invention relates generally to video encoding and decoding and, more particularly, to a method and apparatus for scalable video encoding and decoding.

BACKGROUND OF THE INVENTION

Regions-of-interest (ROI) scalability is an essential feature for some scalable video coding applications. Users may want to have different spatial/temporal/quality scalability inside and outside of ROIs.

Flexible macroblock ordering (FMO) has been discussed to implement the feature of ROI. The International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 standard (hereinafter the "MPEG4/H.264 standard" or simply the "H.264 standard") requires that each macroblock in an image be included in a slice group, and that all slice groups be coded in primary coded pictures (although it is not required for redundant pictures). The H.264 standard does not allow any missing slice groups, which means that even for slice groups that include non-ROIs, we still need to code these slice groups and send them into the network. It may be argued that the encoder has the option to control the bits for the macroblocks outside the ROI. For example, in one prior art implementation, the encoder can code all the macroblocks in non-ROIs to be BL_SKIP or INTRA_BL mode. Even though the bits required to signal the BL_SKIP or INTRA_BL mode might be small, it still takes the encoder extra effort to code them. More importantly, to code non-ROIs requires extra NAL units and, hence, extra bit rate overhead. For example, in the cases of a ROI versus non-ROI split of (¼ versus ¾) and (½ versus ½) for a quarter common intermediate format (QCIF) base layer and common intermediate format (CIF) enhancement layer (30 fps), the bit rate overhead to transmit INTRA_BL mode for the non-ROI region in the enhancement layer over real-time protocol (RTP) is approximately calculated as 12 kbps and 9 kbps, respectively. At the same time it increases the burden on the router to parse all these NAL units. In addition, the decoder still needs to parse those bit streams for non-ROIs. It should be noted that in the Joint Scalable Video Model (JSVM) Version 3.0, supporting INTRA_BL mode for all the macroblocks in the enhancement layer regardless of base layer macroblock types requires multi-loop decoding, which may not be allowed for some profiles. This constraint limits the usage of INTRA_BL mode if the encoder only supports single loop decoding. Thus, currently, JSVM Version 3.0 does not allow the use of INTRA_BL mode for all MBs in non-ROI regardless of single or multiple decoding loop.

SUMMARY OF THE INVENTION

These and other drawbacks and disadvantages of the prior art are addressed by the present invention, which is directed to a method and apparatus for scalable video encoding and decoding.

According to an aspect of the present invention, there is provided a scalable video encoder. The scalable video encoder includes an encoder for encoding a picture to form a base layer bitstream and an enhancement layer bitstream. The base layer bitstream and the enhancement layer bitstream are formed by partitioning the picture into a plurality of image blocks, grouping the plurality of image blocks into one or more slice groups in the base layer bitstream and into two or more slice groups in the enhancement layer bitstream, encoding all of the one or more slice groups in the base layer bitstream and less than all of the two or more slice groups in the enhancement layer such that at least one slice group from among the two or more slice groups is intentionally un-encoded in the enhancement layer bitstream, encoding a syntax element in a header to indicate the at least one intentionally un-encoded slice group in the enhancement layer.

According to another aspect of the present invention, there is provided a method for scalable video encoding. The method includes encoding a picture to form a base layer bitstream and an enhancement layer bitstream. The encoding step includes partitioning the picture into a plurality of image blocks. The encoding step also includes grouping the plurality of image blocks into one or more slice groups in the base layer bitstream and into two or more slice groups in the enhancement layer bitstream. The encoding step further includes encoding all of the one or more slice groups in the base layer bitstream and less than all of the two or more slice groups in the enhancement layer such that at least one slice group from among the two or more slice groups is intentionally un-encoded in the enhancement layer bitstream. The encoding step additionally includes encoding a syntax element in a header to indicate the at least one intentionally un-encoded slice group in the enhancement layer.

According to yet another aspect of the present invention, there is provided a scalable video decoder. The scalable video decoder includes a decoder for decoding a base layer bitstream and an enhancement layer bitstream. The base layer bitstream and the enhancement layer bitstream are decoded by reading a syntax element indicating at least one of a plurality of slice groups is intentionally un-encoded in the enhancement layer; decoding the enhancement layer bitstream using only base layer information for the at least one of the plurality of slice groups indicated by the syntax element; and decoding any remaining ones of the plurality of slice groups in the enhancement layer using enhancement layer information.

According to still another aspect of the present invention, there is provided a method for scalable video decoding. The method includes decoding a base layer bitstream and an enhancement layer bitstream by reading a syntax element indicating at least one of a plurality of slice groups is intentionally un-encoded in the enhancement layer, decoding the enhancement layer bitstream using only base layer information for the at least one of the plurality of slice groups indicated by the syntax element, and decoding any remaining ones of the plurality of slice groups in the enhancement layer using enhancement layer information.

According to a further aspect of the present invention, there is provided a video signal structure for scalable video encoding. The video signal structure includes a picture encoded to form a base layer bitstream and an enhancement layer bitstream. The base layer bitstream and the enhancement layer bitstream are formed by partitioning the picture into a plurality of image blocks, grouping the plurality of image blocks into one or more slice groups in the base layer bitstream and into two or more slice groups in the enhancement layer bitstream, encoding all of the one or more slice groups in the base layer bitstream and less than all of the two or more slice groups in the enhancement layer such that at least one slice group from among the two or more slice groups is intentionally un-encoded in the enhancement layer bitstream, encoding a syntax element in a header to indicate the at least one intentionally un-encoded slice group in the enhancement layer.

According to a yet further aspect of the present invention, there is provided a storage media having scalable video signal data encoded thereupon. The storage media includes a picture encoded to form a base layer bitstream and an enhancement layer bitstream. The base layer bitstream and the enhancement layer bitstream are formed by partitioning the picture into a plurality of image blocks, grouping the plurality of image blocks into one or more slice groups in the base layer bitstream and into two or more slice groups in the enhancement layer bitstream, encoding all of the one or more slice groups in the base layer bitstream and less than all of the two or more slice groups in the enhancement layer such that at least one slice group from among the two or more slice groups is intentionally un-encoded in the enhancement layer bitstream, encoding a syntax element in a header to indicate the at least one intentionally un-encoded slice group in the enhancement layer.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
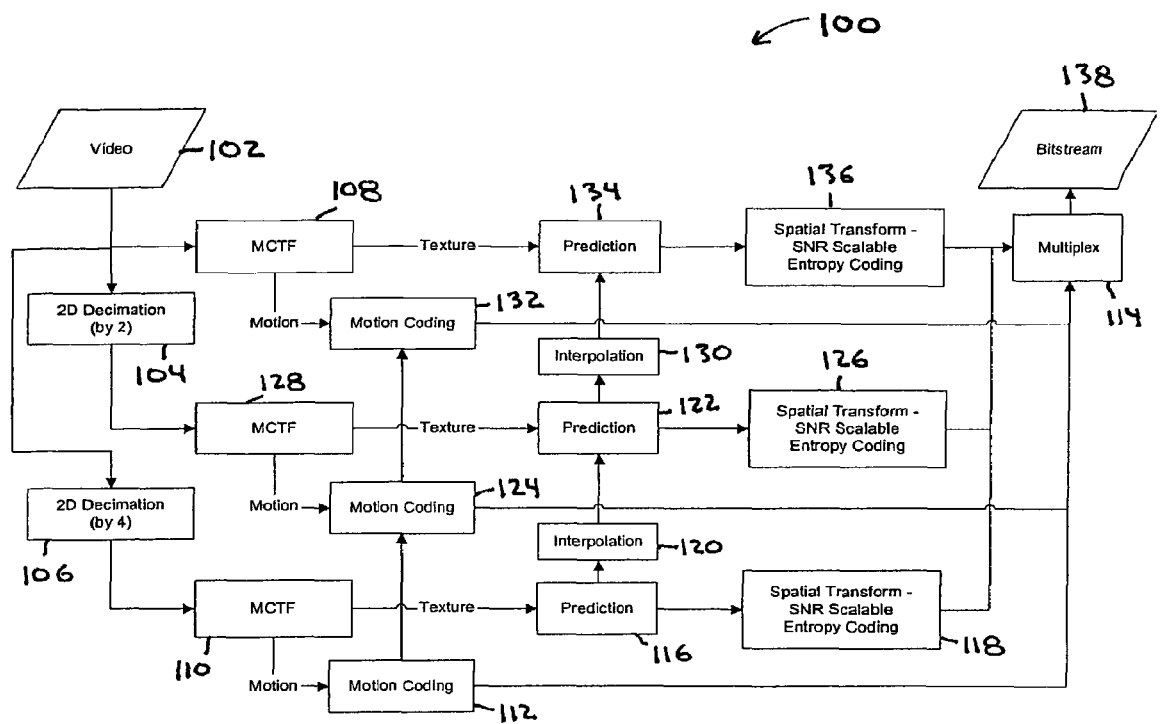
FIG. 1 shows a block diagram for an exemplary Joint Scalable Video Model (JSVM) 3.0 encoder to which the present principles may be applied.

The present invention is directed to a method and apparatus for scalable video encoding and decoding.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Turning to FIG. 1, an exemplary Joint Scalable Video Model Version 3.0 (hereinafter "JSVM3.0") encoder to which the present invention may be applied is indicated generally by the reference numeral 100. The JSVM3.0 encoder 100 uses three spatial layers and motion compensated temporal filtering. The JSVM encoder 100 includes a two-dimensional (2D) decimator 104, a 2D decimator 106, and a motion compensated temporal filtering (MCTF) module 108, each having an input for receiving video signal data 102.

An output of the 2D decimator 106 is connected in signal communication with an input of a MCTF module 110. A first output of the MCTF module 110 is connected in signal communication with an input of a motion coder 112, and a second output of the MCTF module 110 is connected in signal communication with an input of a prediction module 116. A first output of the motion coder 112 is connected in signal communication with a first input of a multiplexer 114. A second output of the motion coder 112 is connected in signal communication with a first input of a motion coder 124. A first output of the prediction module 116 is connected in signal communication with an input of a spatial transformer 118. An output of the spatial transformer 118 is connected in signal communication with a second input of the multiplexer 114. A second output of the prediction module 116 is connected in signal communication with an input of an interpolator 120. An output of the interpolator is connected in signal communication with a first input of a prediction module 122. A first output of the prediction module 122 is connected in signal communication with an input of a spatial transformer 126. An output of the spatial transformer 126 is connected in signal communication with the second input of the multiplexer 114. A second output of the prediction module 122 is connected in signal communication with an input of an interpolator 130. An output of the interpolator 130 is connected in signal communication with a first input of a prediction module 134. An output of the prediction module 134 is connected in signal communication with a spatial transformer 136. An output of the spatial transformer is connected in signal communication with the second input of a multiplexer 114.

An output of the 2D decimator 104 is connected in signal communication with an input of a MCTF module 128. A first output of the MCTF module 128 is connected in signal communication with a second input of the motion coder 124. A first output of the motion coder 124 is connected in signal communication with the first input of the multiplexer 114. A second output of the motion coder 124 is connected in signal communication with a first input of a motion coder 132. A second output of the MCTF module 128 is connected in signal communication with a second input of the prediction module 122.

A first output of the MCTF module 108 is connected in signal communication with a second input of the motion coder 132. An output of the motion coder 132 is connected in signal communication with the first input of the multiplexer 114. A second output of the MCTF module 108 is connected in signal communication with a second input of the prediction module 134. An output of the multiplexer 114 provides an output bitstream 138.

For each spatial layer, a motion compensated temporal decomposition is performed. This decomposition provides temporal scalability. Motion information from lower spatial layers can be used for prediction of motion on the higher layers. For texture encoding, spatial prediction between successive spatial layers can be applied to remove redundancy. The residual signal resulting from intra prediction or motion compensated inter prediction is transform coded. A quality base layer residual provides minimum reconstruction quality at each spatial layer. This quality base layer can be encoded into an H.264 standard compliant stream if no inter-layer prediction is applied. For quality scalability, quality enhancement layers are additionally encoded. These enhancement layers can be chosen to either provide coarse or fine grain quality (SNR) scalability.

Figure 2:
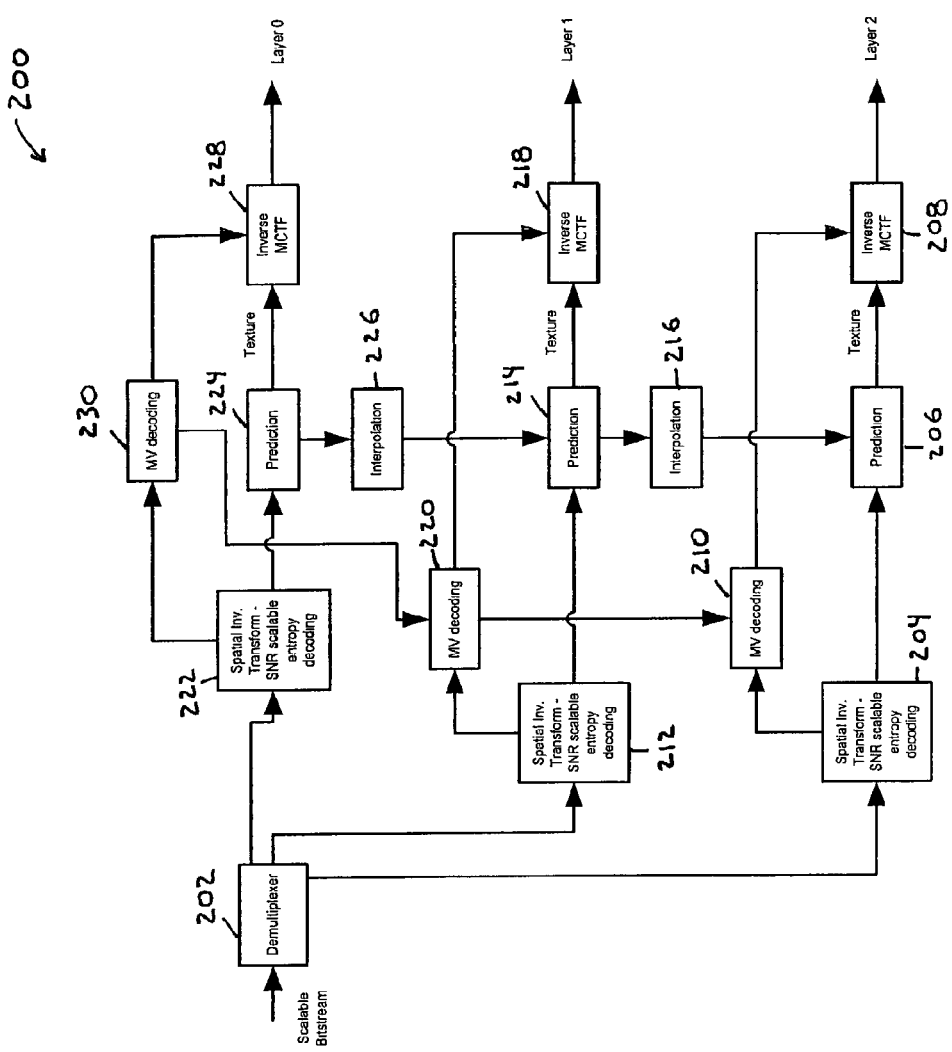
FIG. 2 shows a block diagram for an exemplary decoder to which the present principles may be applied.

Turning to FIG. 2, an exemplary scalable video decoder to which the present invention may be applied is indicated generally by the reference numeral 200. An input of a demultiplexer 202 is available as an input to the scalable video decoder 200, for receiving a scalable bitstream. A first output of the demultiplexer 202 is connected in signal communication with an input of a spatial inverse transform SNR scalable entropy decoder 204. A first output of the spatial inverse transform SNR scalable entropy decoder 204 is connected in signal communication with a first input of a prediction module 206. An output of the prediction module 206 is connected in signal communication with a first input of an inverse MCTF module 208.

A second output of the spatial inverse transform SNR scalable entropy decoder 204 is connected in signal communication with a first input of a motion vector (MV) decoder 210. An output of the MV decoder 210 is connected in signal communication with a second input of the inverse MCTF module 208.

A second output of the demultiplexer 202 is connected in signal communication with an input of a spatial inverse transform SNR scalable entropy decoder 212. A first output of the spatial inverse transform SNR scalable entropy decoder 212 is connected in signal communication with a first input of a prediction module 214. A first output of the prediction module 214 is connected in signal communication with an input of an interpolation module 216. An output of the interpolation module 216 is connected in signal communication with a second input of the prediction module 206. A second output of the prediction module 214 is connected in signal communication with a first input of an inverse MCTF module 218.

A second output of the spatial inverse transform SNR scalable entropy decoder 212 is connected in signal communication with a first input of an MV decoder 220. A first output of the MV decoder 220 is connected in signal communication with a second input of the MV decoder 210. A second output of the MV decoder 220 is connected in signal communication with a second input of the inverse MCTF module 218.

A third output of the demultiplexer 202 is connected in signal communication with an input of a spatial inverse transform SNR scalable entropy decoder 222. A first output of the spatial inverse transform SNR scalable entropy decoder 222 is connected in signal communication with an input of a prediction module 224. A first output of the prediction module 224 is connected in signal communication with an input of an interpolation module 226. An output of the interpolation module 226 is connected in signal communication with a second input of the prediction module 214.

A second output of the prediction module 224 is connected in signal communication with a first input of an inverse MCTF module 228. A second output of the spatial inverse transform SNR scalable entropy decoder 222 is connected in signal communication with an input of an MV decoder 230. A first output of the MV decoder 230 is connected in signal communication with a second input of the MV decoder 220. A second output of the MV decoder 230 is connected in signal communication with a second input of the inverse MCTF module 228.

An output of the inverse MCTF module 228 is available as an output of the decoder 200, for outputting a layer 0 signal. An output of the inverse MCTF module 218 is available as an output of the decoder 200, for outputting a layer 1 signal. An output of the inverse MCTF module 208 is available as an output of the decoder 200, for outputting a layer 2 signal.

FMO (flexible macroblock ordering) has been discussed to implement the feature of ROI (region of interest) scalability. The H.264/AVC specification does not allow any missing slice groups, which means that even slice groups that include non-ROIs still need to be coded and sent into a network. In accordance with an embodiment of the present principles, this requirement is relaxed and we allow missing slice groups in enhancement layers, and define a normative behavior for intentionally missing slices. The base layer remains compatible with the H.264 standard.

Thus, in accordance with an embodiment of the present principles, we propose to relax the H.264 standard requirements to allow missing slice groups in the enhancement layer for the application of ROI. This approach provides at least the following advantages: (a) saves bit rate; (b) reduces the burden on the router; (c) simplifies parsing for the decoder; and (d) and saves coding for the encoder for non-ROI regions.

If we allow missing slice groups in the enhancement layer, one immediate issue that arises is how the decoder can determine if a missing slice group is intentionally not encoded by the encoder or is dropped because of network errors. If a slice group is intentionally omitted then, in accordance with the present principles, the decoder provides a normative behavior, so that the decoder can still have the capability to decode the whole picture (ROI+non-ROI), the output of the decoding process behaves consistently between different decoders, and encoder/decoder bit-exactness can be maintained. However, if a slice group is dropped because of network error, a non-normative error concealment can be applied, which is application dependent.

type equal to 0, 1, and 6. For other cases, we can always presume that only the last slice group is missing, so no additional syntax is required. For the most commonly expected case of rectangular ROI scalability, slice_group_map_type==2 will be selected and, thus, little syntax is added in picture_parameter_set(). A complete syntax is shown in TABLE 2.

TABLE 1

| Seq_parameter_set_rbsp( ) { | C | Descriptor |
|---|---|---|
|     profile_idc | 0 | u(8) |
|     ... | | |
|     num_ref_frames | 0 | ue(v) |
|     gaps_in_frame_num_value_allowed_flag | 0 | u(1) |
|     if ( profile_idc = = 83 ) | | |
|         missing_slice_groups_allowed_flag | 0 | u(1) |
|     ... | 0 | u(1) |
| } | | |

TABLE 2

| pic_parameter_set_rbsp( ) { | C | Descriptor |
|---|---|---|
|   pic_parameter_set_id | 1 | ue(v) |
|   seq_parameter_set_id | 1 | ue(v) |
|   entropy_coding_mode_flag | 1 | u(1) |
|   pic_order_present_flag | 1 | u(1) |
|   num_slice_groups_minus1 | 1 | ue(v) |
|   if( num_slice_groups_minus1 > 0 ) { | | |
|     slice_group_map_type | 1 | ue(v) |
|     if( slice_group_map_type = = 0 ) | | |
|       for( iGroup = 0; iGroup <= num_slice_groups_minus1; iGroup++ ) | | |
|         run_length_minus1[ iGroup ] | 1 | ue(v) |
|     else if( slice_group_map_type = = 2 ) | | |
|       for( iGroup = 0; iGroup < num_slice_groups_minus1; iGroup++ ) { | | |
|         top_left[ iGroup ] | 1 | ue(v) |
|         bottom_right[ iGroup ] | 1 | ue(v) |
|       } | | |
|     else if( slice_group_map_type = = 3 \|\| | | |
|         slice_group_map_type = = 4 \|\| | | |
|         slice_group_map_type = = 5 ) { | | |
|       slice_group_change_direction_flag | 1 | u(1) |
|       slice_group_change_rate_minus1 | 1 | ue(v) |
|     } else if( slice_group_map_type = = 6 ) { | | |
|       pic_size_in_map_units_minus1 | 1 | ue(v) |
|       for( i = 0; i <= pic_size_in_map_units_minus1; i++ ) | | |
|         slice_group_id[ i ] | 1 | u(v) |
|     } | | |
|   } | | |
|   if ( ( profile_idc = = 83 ) && (missing_slice_groups_allowed_flag ) | | |
|     && (num_slice_group_minus1 > 0) ) { | | |
|     num_missing_slice_group | 1 | ue(v) |
|     if (num_missing_slice_group > 0) { | | |
|       if ( slice_group_map_type = = 0 \|\| | | |
|         slice_group_map_type = = 1 \|\| | | |
|         slice_group_map_type = = 6 ) { | | |
|         for ( i = 0; i < num_missing_slice_group; i++) { | | |
|           missing_slice_group_id[ i ] | 1 | u(v) |
|         } | | |
|       } | | |
|     } | | |
|   } | | |
|   ... | | |
| } | | |

To clear the ambiguity of whether a slice group is intentionally or un-intentionally missing, we propose to add one flag in sequence_parameter_set() namely missing_slice_groups_allowed_flag, as shown in TABLE 1. In particular, TABLE 1 illustrates the sequence parameter set RBSP syntax. To support all slice_group_map_types, we need to indicate which slice groups are missing for slice_group_map_ missing_slice_groups_allowed_flag specifies the allowance of missing slice groups in the bitstream. When missing_slice_groups_allowed_flag is not present, it shall be inferred to be equal to 0. When missing_slice_groups_allowed_flag is equal to 1, then the "same slice group mapping" has to exist between the base layer and the enhancement layer. The "same slice group mapping" means the same num_slice_groups_minus_1 and the same slice_group_map_type.

num_missing_slice_groups specifies the number of missing slice groups for a picture.

missing_slice_group_id identifies a missing slice group of the i-th missing slice group map unit in raster scan order.

With the provided new syntax, the decoder can decide if a slice group in the enhancement layer is intentionally missing or is instead dropped because of network error. In deciding what should be a normative behavior of decoding processing for an intentionally missing group, the following may be considered: (1) since a missing slice group is applied to non-ROI in enhancement layer, the quality need not be very high, but the quality should be acceptable; and (2) the complexity should be kept low and the decoder should re-use the available functionality in the current SVC design.

We propose two possible solutions that may use current SVC design: (1) use INTRA_BL mode without residue, i.e., copy or upsample the base_layer picture; and (2) use BL_SKIP mode without residue. Consequently, we can choose normative behaviors using either of the above methods to decode an intentionally missing slice group.

Figure 3:
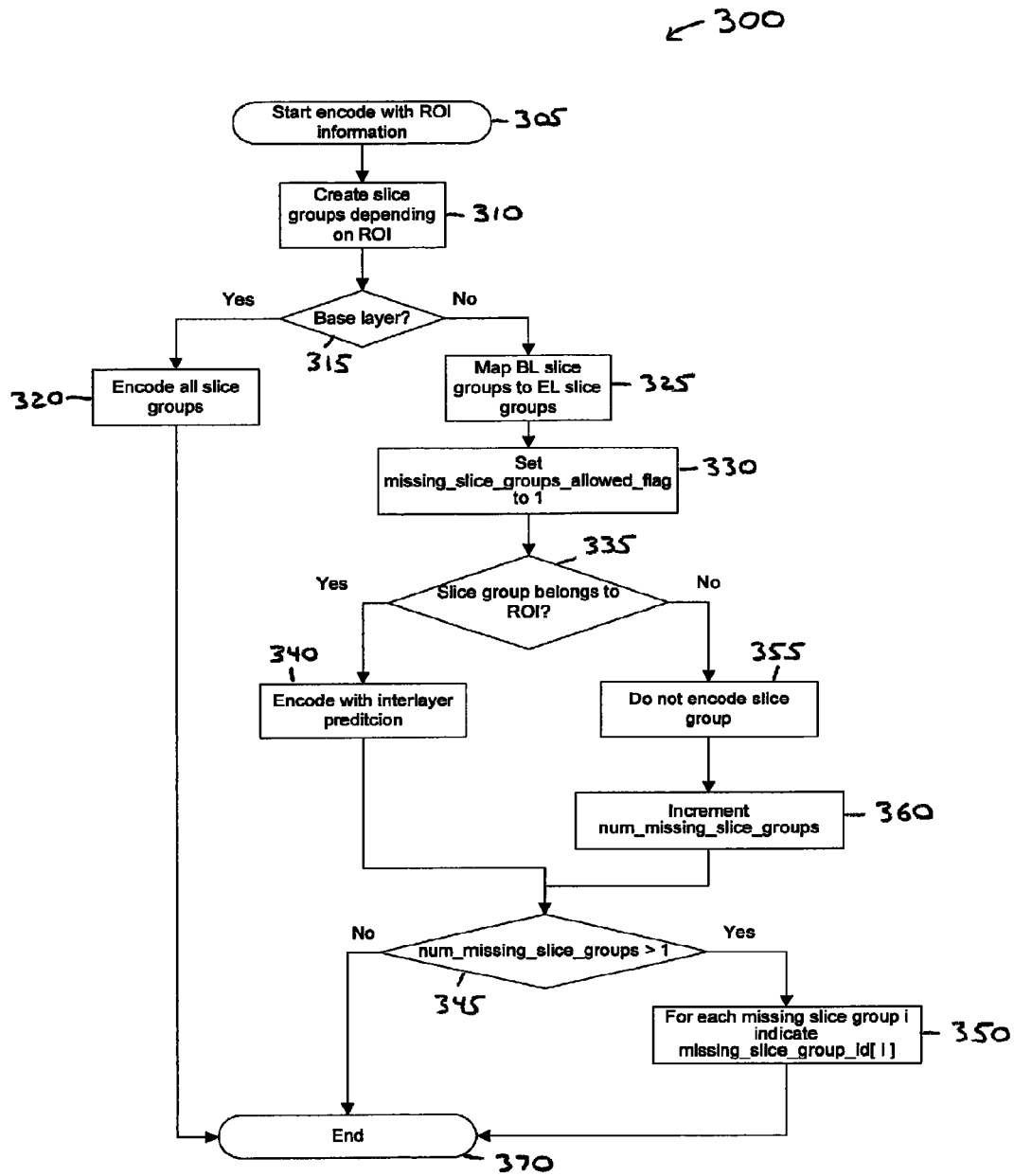
FIG. 3 shows a flow diagram for an exemplary method for joint scalable video encoding with regions of interest in accordance with an embodiment of the present principles.

Turning to FIG. 3, an exemplary method for joint scalable video encoding with regions of interest is indicated generally by the reference numeral 300. The method includes a start block 305 that starts encoding with region of interest (ROI) information, and passes control to a function block 310. The function block 310 creates slice groups depending on the ROI information, and passes control to a decision block 315. The decision block 315 determines whether or not the current layer to be encoded is the base layer. If so, then control is passed to a function block 320. Otherwise, control is passed to a function block 325.

The function block 320 encodes all slice groups (in the base layer), and passes control to an end block 370.

The function block 325 maps base layer slice groups to enhancement layer slice groups, and passes control to a function block 330. The function block 330 sets missing_slice_groups_allowed_flag equal to one, and passes control to a decision block 335. The decision block 335 determines whether or not the current slice group belongs to a region of interest. If so, then control is passed to a function block 340. Otherwise, control is passed to a function block 355.

The function block 340 encodes the current slice group using interlayer prediction, and passes control to a decision block 345.

The function block 355 does not encode the current slice group, and passes control to a function block 360. The function block 360 increments num_missing_slice_groups, and passes control to the decision block 345.

The decision block 345 determines whether or not num_missing_slice_groups is greater than one. If so, then control is passed to a function block 350. Otherwise, control is passed to the end block 370.

The function block 350, for each missing slice group i, indicates missing_slice_groups_id, and passes control to the end block 370.

Figure 4:
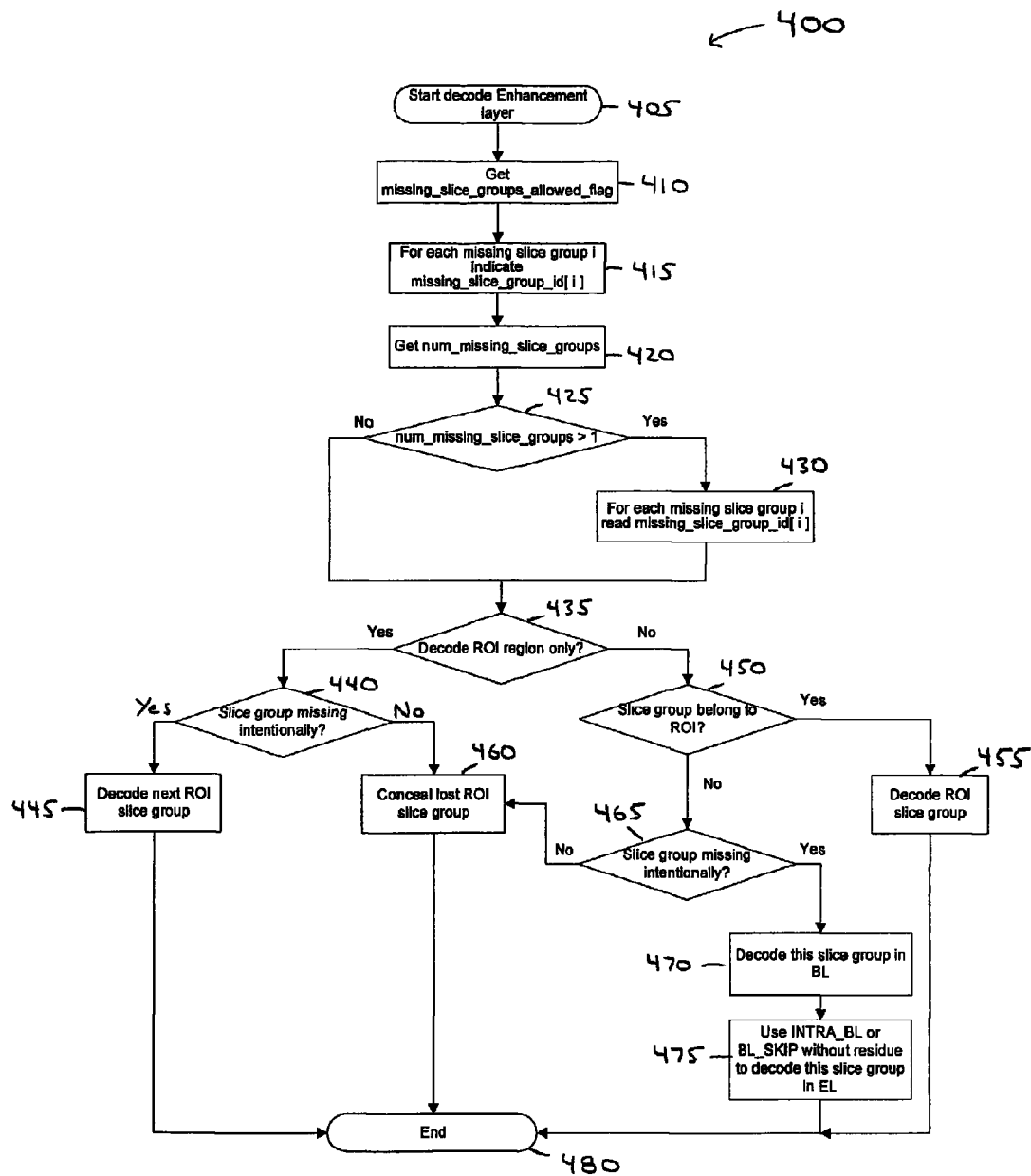
FIG. 4 shows a flow diagram for an exemplary method for joint scalable video decoding with regions of interest in accordance with an embodiment of the present principles.

Turning to FIG. 4, an exemplary method for joint scalable video decoding with region of interests is indicated generally by the reference numeral 400. The method includes a start block 405 that starts decoding the enhancement layer, and passes control to a function block 410. The function block 410 gets missing_slice_groups_allowed_flag, and passes control to a function block 415. The function block 415, for each missing slice group i, indicates missing_slice_group_id, and passes control to a function block 420. The function block 420 gets num_missing_slice_groups, and passes control to a decision block 425. The decision block 425 determines whether or not num_missing_slice_groups is greater than one. If so, then control is passed to a function block 430. Otherwise, control is passed to a decision block 435.

The function block 430, for each slice group i, reads missing_slice_group_id, and passes control to the decision block 435.

The decision block 435 determines whether or not to only decode the ROI region. If so, then control is passed to a decision block 440. Otherwise, control is passed to a decision block 450.

The decision block 440 determines whether or not a slice group (that includes the ROI region) is intentionally missing. If so, then control is passed to a function block 445. Otherwise, control is passed to a function block 460.

The function block 445 decodes the next ROI slice group, and passes control to an end block 480.

The function block 460 conceals the lost ROI slice group, and passes control to the end block 480.

The decision block 450 determines whether or not the slice group belongs to a ROI. If so, then control is passed to a function block 455. Otherwise, control is passed to a decision block 465.

The function block 455 decodes the ROI slice group, and passes control to the end block 480.

The decision block 465 determines whether or not the slice group is intentionally missing. If so, then control is passed to a function block 470. Otherwise, control is passed to the function block 460.

The function block 470 decodes this slice group in the base layer, and passes control to a function block 475. The function block 475 uses INTRA_BL mode or BL_SKIP mode without residue to decode this slice group in the enhancement layer, and passes control to the end block 480.

A description will now be given of some of the many attendant advantages/features of the present invention, some of which have been mentioned above. For example, one advantage/feature is a scalable video encoder. The scalable video encoder includes an encoder for encoding a picture to form a base layer bitstream and an enhancement layer bitstream. The base layer bitstream and the enhancement layer bitstream are formed by partitioning the picture into a plurality of image blocks, grouping the plurality of image blocks into one or more slice groups in the base layer bitstream and into two or more slice groups in the enhancement layer bitstream, encoding all of the one or more slice groups in the base layer bitstream and less than all of the two or more slice groups in the enhancement layer such that at least one slice group from among the two or more slice groups is intentionally un-encoded in the enhancement layer bitstream, encoding a syntax element in a header to indicate the at least one intentionally un-encoded slice group in the enhancement layer.

Another advantage/feature is the scalable video encoder as described above, wherein the enhancement layer bitstream is formed to support at least one region of interest application, such that any of the two or more slice groups in the enhancement layer that include regions of interest are encoded in the enhancement layer bitstream while any of the two or more slice groups in the enhancement layer that are without regions of interest are intentionally un-encoded.

Yet another advantage/feature is the scalable video encoder as described above, wherein the encoder adds the syntax element by adding a missing_slice_groups_allowed_flag field in a sequence parameter set corresponding to the enhancement layer bitstream.

Also, another advantage/feature is the scalable video encoder that adds the syntax element as described above, wherein a same slice group mapping exists between the enhancement layer bitstream and the base layer bitstream, when the missing_slice_groups_allowed_flag field is equal to 1, the same slice group mapping relating to a num_slice_groups_minus_1 field and a slice_group_map_type field respectively having a same value for the base layer bitstream and the enhancement layer bitstream.

Moreover, another advantage/feature is the scalable video encoder as described above, wherein the encoder adds a num_missing_slice_groups field in a picture parameter set corresponding to the enhancement layer bitstream to specify a quantity of slice groups that are intentionally un-encoded for the picture.

Further, another advantage/feature is the scalable video encoder that adds the num_missing_slice_groups field as described above, wherein the encoder adds a missing_slice_group_id field in a picture parameter set corresponding to the enhancement layer bitstream to identify therein the at least intentionally un-encoded slice group of an i-th intentionally omitted slice group map unit in raster scan order for a slice_group_map field equal to any of 0, 1 and 6.

Further, another advantage/feature is the scalable video encoder that adds the num_missing_slice_groups field as described above, wherein the encoder sets a slice_group_map field equal to any of 2, 3, 4, and 5 to indicate that a last slice group in the enhancement layer bitstream is the at least one intentionally un-encoded slice group.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus for scalable video encoding comprising:
an encoder for encoding a picture to form a base layer and an enhancement layer by partitioning the picture into a plurality of image blocks and associating the plurality of image blocks into one or more slices; encoding all of the one or more slices for the base layer and less than all of the one or more slices for the enhancement layer; and encoding a syntax element to indicate the at least one not encoded slice in the enhancement layer.

2. The apparatus of claim 1, wherein the enhancement layer is formed to support at least one region of interest application, such that the less than all of the one or more slices for the enhancement layer that are encoded in the enhancement layer are included in slice groups that include regions of interest, while the at least one not encoded slice in the enhancement layer is included in at least one slice group that is without a region of interest.

3. The apparatus of claim 1, wherein the syntax element is included in a header.

4. A method for scalable video encoding, comprising:
encoding a picture to form a base layer and an enhancement layer,
wherein said encoding step comprises:
partitioning the picture into a plurality of image blocks;
associating the plurality of image blocks into one or more slices;
encoding all of the one or more slices for the base layer and less than all of the one or more slices for the enhancement layer; and
encoding a syntax element to indicate the at least one not encoded slices in the enhancement layer.

5. The method of claim 4, wherein the enhancement layer is formed to support at least one region of interest application, such that the less than all of the one or more slices for the enhancement layer that are encoded in the enhancement layer are included in slice groups that include regions of interest, while the at least one not encoded slice in the enhancement layer is included in at least one slice group that is without a region of interest.

6. The method of claim 4, wherein the syntax element is included in a header.

7. An apparatus for scalable video decoding comprising:
a decoder for decoding a base layer and an enhancement layer by parsing a syntax element indicating one or more slices was intentionally not encoded in the enhancement layer; decoding for the one or more slices intentionally not encoded in the enhancement layer using only base layer information; and decoding any remaining ones of the plurality of slices in the enhancement layer using enhancement layer information.

8. The apparatus of claim 7, wherein the syntax element is included in a header.

9. The apparatus of claim 7, wherein said decoder uses INTRA_BL mode to decode the one or more slices not encoded in the enhancement layer, regardless of whether multi-loop decoding is allowed in a particular profile indicated for the enhancement layer.

10. The apparatus of claim 7, wherein said decoder uses BL_SKIP mode to decode the one or more slices not encoded in the enhancement layer.

11. The apparatus of claim 7, wherein said decoder performs an error concealment method to conceal the one or more slices not encoded in the enhancement layer, when the one or more slices not encoded in the enhancement layer is detected as missing but is not specified in a sequence parameter set and a picture parameter set corresponding to the enhancement layer.

12. A method for scalable video decoding, comprising:

parsing a syntax element indicating one or more slices was intentionally not encoded in the enhancement layer, decoding, for the one or more slices intentionally not encoded in the enhancement layer, using only base layer information; and decoding any remaining ones of the plurality of slices in the enhancement layer using enhancement layer information.

13. The method of claim 12, wherein the syntax element is included in a header.

14. The method of claim 12, wherein INTRA_BL mode is used to decode the one or more slices not encoded in the enhancement layer, regardless of whether multi-loop decoding is allowed in a particular profile indicated for the enhancement layer.

15. The method of claim 12, wherein BL_SKIP mode is used to decode the one or more slices not encoded in the enhancement layer.

16. The method of claim 12, further comprising performing an error concealment method to conceal the one or more slices not encoded in the enhancement layer, when the one or more slices not encoded in the enhancement layer is detected as missing but is not specified in a sequence parameter set and a picture parameter set corresponding to the enhancement layer.

17. A non-transitory storage media having scalable video signal data encoded thereupon, comprising:

a picture encoded to form a base layer and an enhancement layer by partitioning the picture into a plurality of image blocks and associating the plurality of image blocks into one or more slices; and wherein all of the one or more slices for the base layer are encoded and less than all of the one or more slices for the enhancement layer are encoded; and a syntax element is encoded to indicate the at least one not encoded slice in the enhancement layer.

* * * * *